(12) United States Patent
Wagner et al.

(10) Patent No.: US 8,201,157 B2
(45) Date of Patent: Jun. 12, 2012

(54) DEPENDENCY CHECKING AND MANAGEMENT OF SOURCE CODE, GENERATED SOURCE CODE FILES, AND LIBRARY FILES

(75) Inventors: Timothy Allen Wagner, Seattle, WA (US); Timothy Hanson, Seattle, WA (US); Jesse Michael Garms, Seattle, WA (US); Michael Kovaks, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1376 days.

(21) Appl. No.: 11/743,862

(22) Filed: May 3, 2007

(65) Prior Publication Data

US 2008/0022268 A1    Jan. 24, 2008

Related U.S. Application Data

(60) Provisional application No. 60/803,096, filed on May 24, 2006.

(51) Int. Cl.
G06F 9/45 (2006.01)
(52) U.S. Cl. .................... 717/145; 717/140; 717/141
(58) Field of Classification Search ................... None
See application file for complete search history.

(56) References Cited

U.S. PATENT DOCUMENTS

| | | | | |
|---|---|---|---|---|
| 5,204,960 A * | 4/1993 | Smith et al. | ............. | 717/145 |
| 5,230,050 A * | 7/1993 | Iitsuka et al. | ............. | 717/145 |
| 5,313,387 A * | 5/1994 | McKeeman et al. | ............. | 700/90 |
| 5,586,328 A * | 12/1996 | Caron et al. | ............. | 717/146 |
| 5,625,822 A * | 4/1997 | Brett | ............. | 717/145 |
| 5,790,861 A * | 8/1998 | Rose et al. | ............. | 717/145 |
| 5,848,274 A * | 12/1998 | Hamby et al. | ............. | 717/153 |
| 5,854,932 A * | 12/1998 | Mariani et al. | ............. | 717/116 |
| 5,923,880 A * | 7/1999 | Rose et al. | ............. | 717/145 |
| 5,941,983 A * | 8/1999 | Gupta et al. | ............. | 712/214 |
| 5,978,585 A * | 11/1999 | Crelier | ............. | 717/145 |
| 6,789,253 B1 * | 9/2004 | Streich et al. | ............. | 717/138 |
| 6,973,646 B1 * | 12/2005 | Bordawekar et al. | ............. | 717/146 |
| 7,076,764 B2 * | 7/2006 | Kramer | ............. | 717/120 |
| 7,082,601 B2 * | 7/2006 | Ohsawa et al. | ............. | 717/149 |
| 7,296,262 B2 * | 11/2007 | Broussard | ............. | 717/141 |
| 7,340,729 B2 * | 3/2008 | Schmitt et al. | ............. | 717/145 |
| 7,509,244 B1 * | 3/2009 | Shakeri et al. | ............. | 703/7 |
| 7,882,498 B2 * | 2/2011 | Ottoni et al. | ............. | 717/149 |
| 2004/0073906 A1 * | 4/2004 | Chamdani et al. | ............. | 718/102 |
| 2005/0091347 A1 * | 4/2005 | Schmitt et al. | ............. | 709/220 |
| 2005/0108695 A1 * | 5/2005 | Li et al. | ............. | 717/144 |
| 2005/0114771 A1 * | 5/2005 | Piehler et al. | ............. | 715/536 |
| 2005/0132344 A1 * | 6/2005 | Vorbach et al. | ............. | 717/151 |
| 2005/0246695 A1 * | 11/2005 | Wang | ............. | 717/148 |
| 2006/0136881 A1 * | 6/2006 | Nesbitt et al. | ............. | 717/140 |

* cited by examiner

*Primary Examiner* — Insun Kang
(74) *Attorney, Agent, or Firm* — Squire Sanders (US) LLP

(57) ABSTRACT

An Integrated Design Environment (IDE) includes an on-the-fly compiler. The IDE does a first compiler pass that review code for dependencies. In the first compiler pass, the IDE compiles source files, where files having any unresolved types or errors are marked for a second pass recompilation. The IDE does a second compiler pass that does a multi-threaded compilation of the code in an order determined using the dependencies. In the second compiler pass, any file that uses the files compiled in the first pass are recompiled. Additionally, any files marked for unresolved types or errors are also recompiled.

14 Claims, 5 Drawing Sheets

Flow chart for two pass compilation process of source files

| A | B | A' | B' |
|---|---|---|---|
| Check | | Create | |
| | Check | | Create |
| Outdate | Outdate | Check | |
| Recheck | | Recreate | |
| | Recheck | | recreate |
Figure 1a. Compilation process
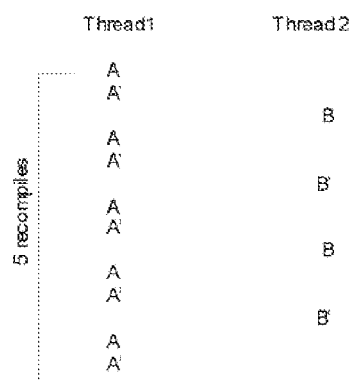
Figure 1b. Compilation process
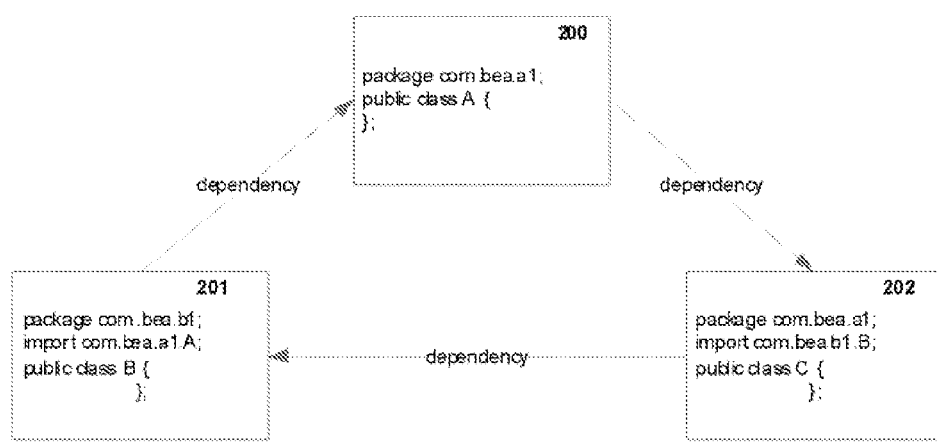
Figure 2. Dependency amongst source files

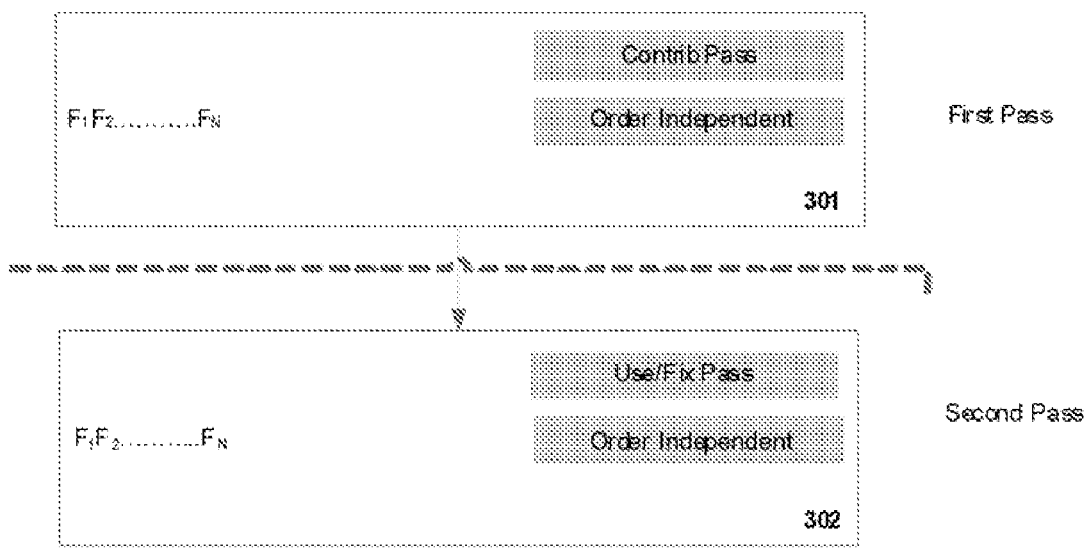
Figure 3. Two pass compilation process

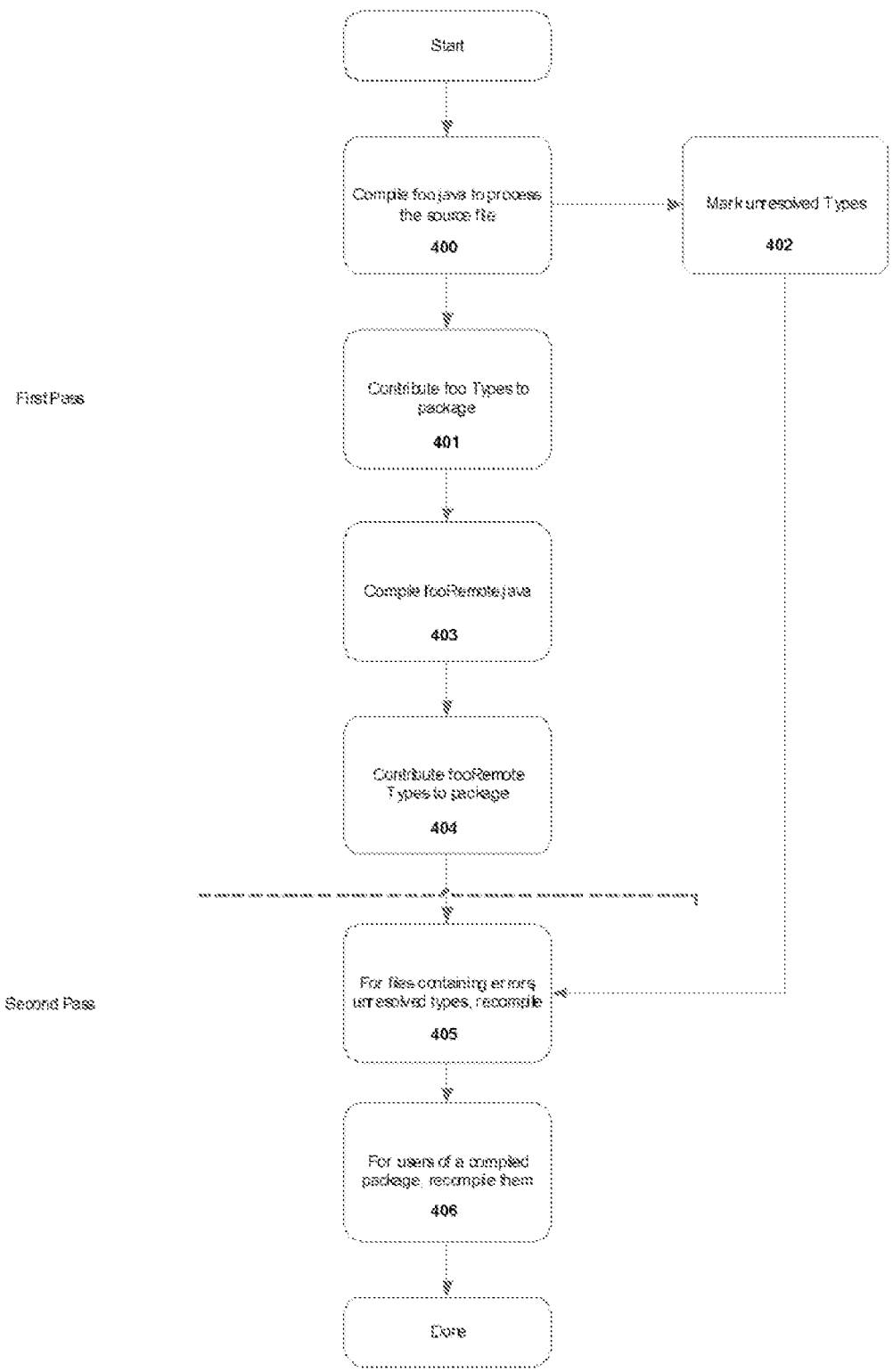
Figure 4. Flow chart for two pass compilation process of source files

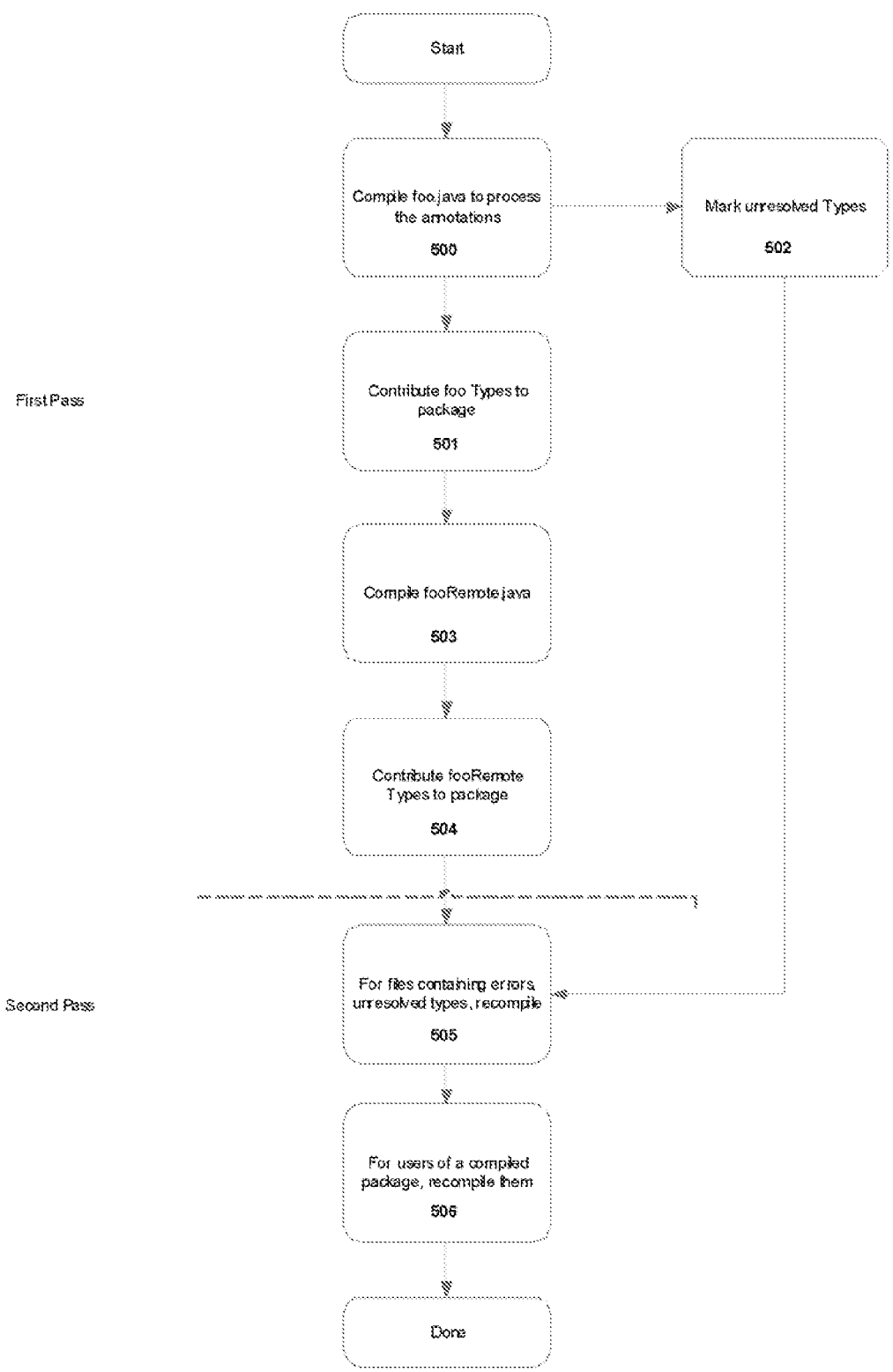
Figure 5. Flow chart for two pass compilation process of source files

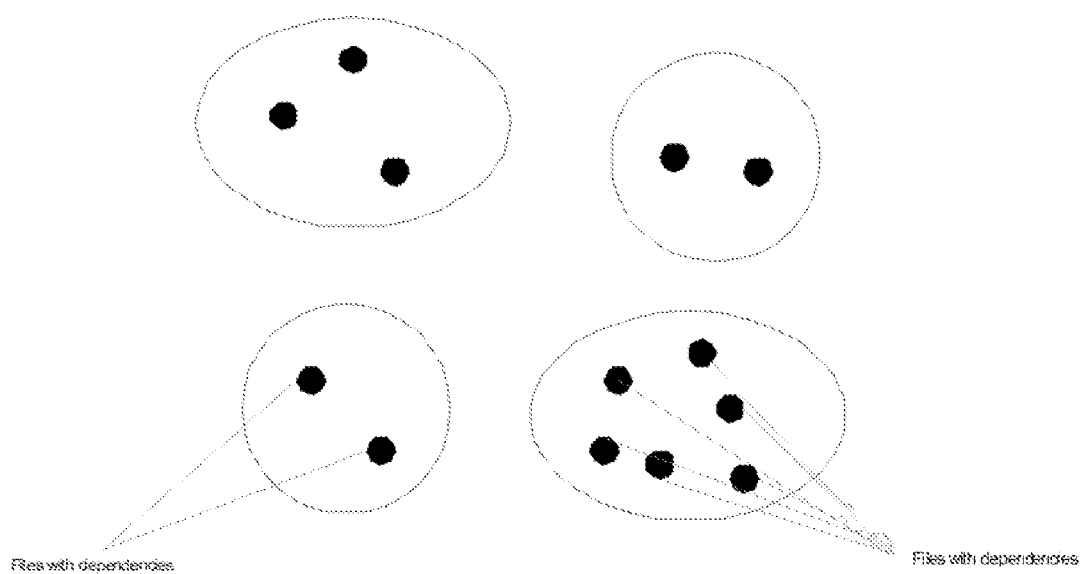
Figure 6. Compilation using partitioning technique

DEPENDENCY CHECKING AND MANAGEMENT OF SOURCE CODE, GENERATED SOURCE CODE FILES, AND LIBRARY FILES

CLAIM OF PRIORITY

This application claims priority from the following co-pending application, which is hereby incorporated in their entirety:

U.S. Provisional Application No. 60/803,096 entitled DEPENDENCY CHECKING AND MANAGEMENT OF SOURCE CODE, GENERATED SOURCE CODE FILES, AND LIBRARY FILES, filed by Timothy A. Wagner et al., filed May 24, 2006.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The present invention relates to the field of programming languages. More specifically, the present invention relates to a method for checking and managing dependencies of source code files, generated source code files, and the libraries in which they are encapsulated.

BACKGROUND OF INVENTION

The basic task of a compiler is to read the source program (s) and translate it into a target language and report any errors in the source program to the user. Typically, several source documents or files are to be compiled to create the executable target program. These documents have interdependencies such that one document or file (A) needs to be compiled first before the next one (B) so that it incorporates the code of this document (A) before compiling (B). There are several possible reasons for recompiling the source—one or more of the class files the source would produce are missing or the source has been modified since it was last compiled or one or more of the classes that the source produces depends on a member in another class that changed.

Similar dependencies might be true for some deployment scenarios such as a runtime component (A) may have a dependency on runtime component (B) which is part of a JAR file. If (B) is redeployed, one will need to redeploy (A) and the associated JAR file. As the source code tree evolves, the interdependencies grow thus making the managing of source code relationships and interdependencies an extremely tedious task. As the number of source files increases into hundreds and thousands, due to a large number of interdependencies—some introduced by import statements, the task of build, release, test, and deploy becomes quite cumbersome and time consuming. Building of subtree might cause the compilation of every source code file in the source tree due to circular dependencies. This results in very lengthy build times.

Also, no source code is free to move along under its own development cycle because of interdependencies. As such branching and merging are extremely time-consuming and complex and can introduce significant developer downtime which is highly undesirable. Also, testing and debugging become difficult as it is hard to isolate sub-branches of code to understand their functionality. Finally, releasing production code is tedious as one has to push dependent source files to the production environment. All of the above further gets complicated when working in a team environment where there are multiple authors of the source code.

Poor dependency management leads to code that is hard to change, fragile, and non-reusable. On the other hand, when dependencies are well managed, the code remains flexible, robust, and reusable.

BRIEF DESCRIPTION OF THE DRAWINGS

FIGS. 1A and 1B are an illustration of the compilation process in accordance to one embodiment of the invention.

FIG. 2 is an illustration of dependency amongst source files in accordance to one embodiment of the invention.

FIG. 3 is an illustration of the two pass compilation process in accordance to one embodiment of the invention.

FIG. 4 is an illustration of flow chart for two pass compilation process in accordance to one embodiment of the invention.

FIG. 5 is an illustration of flow chart for two pass compilation process in accordance to one embodiment of the invention.

FIG. 6 is an illustration of the partitioning technique for compilation process in accordance to one embodiment of the invention.

DETAILED DESCRIPTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Concepts and terminology commonly used by those familiar with compiler and parser design are used herein. Those who are unfamiliar with the inner workings of compilers and parsers are referred to "Compilers: Principals, Techniques and Tools" by A. Aho, R. Sethi and J. Ullman published by Addison Wesley Publishing Company in November 1985 (ISBN 0201100886).

Parts of the description will be presented in terms of operations performed by a processor based device, using terms such as receiving, analyzing, determining, generating, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical and electrical components of the processor based device; and the term processor include microprocessors, micro-controllers, digital signal processors, and the like, that are standalone, adjunct or embedded.

Various operations will be described as multiple discrete steps in turn, in a manner that is most helpful in understanding the present invention; however, the order of description should not be construed as to imply that these operations are necessarily order dependent. In particular, these operations need not be performed in the order of presentation. Further, the description repeatedly uses the phrase "in one embodiment", which ordinarily does not refer to the same embodiment, although it may.

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

One embodiment may be implemented using a conventional general purpose of a specialized digital computer or microprocessor(s) programmed according to the teachings of the present disclosure, as will be apparent to those skilled in the computer art. Appropriate software coding can readily be prepared by skilled programmers based on the teachings of the present discloser, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments where chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

OVERVIEW

One embodiment of the present invention is a computer-implemented method. The method can include a first compiler pass that reviews code for dependences and a second compiler pass that does a multithreaded compilation of the code in an order determined using the dependencies.

The method can be part of an integrated design environment (IDE). The compiling can be done while code is being modified by a user. The compilation can include constructing code using annotations. Sections of the code with dependencies can be partitioned. The first pass can include contributing types to a package. The first pass can include marking a source file with unresolved types or errors. The second pass can compile files with errors.

One embodiment of the present invention is a Integrated Design Environment (IDE) including an on-the-fly compiler. The IDE can do a first compiler pass that reviews code for dependences; and a second compiler pass that does a multithreaded compilation of the code in an order which request determined using the dependencies.

One embodiment of the present invention is a computer-readable medium including code to do a first compiler pass that reviews code for dependences and a second compiler pass that does a multithreaded compilation of the code in an order determined using the dependencies.

The present invention can include the provision of functional descriptions of methods that manage the interdependencies between the source files, generated source files, and the libraries in which they are encapsulated. As discussed above managing dependencies can be critical to the software development and implementation process. A set of consistent and maintainable techniques can be used to manage dependencies. Also, dependencies change over time and as a result they impact the build process of any application. When a Type contained in another file or library or package is needed, a reference to that file or library or package is set. This can create a reference within the current file that identifies the name and version of the dependency. Each time the original file goes through a build, the referenced file or library or package is also recompiled since it is used in the file that is being compiled. As depicted in FIGS. 1$a$ and 1$b$, let's consider two source files A and B. B has a dependency on A. During the compilation process, first A is checked for dependencies and then compiled to produce A'. Since B has a dependency on A, both A and B are compiled to produce A' and B' respectively. Any change in A will mean that both A and B are both outdated due to the dependency between the two source files. File A is rechecked and recompiled and subsequently, B is rechecked and recompiled to produce updated A' and B' output files.

In FIG. 2, class B (201) depends on class A (200) and class C (202) depends on class B thus creating a circular dependency. Similarly, as number of files increases to hundreds and thousands creating a complex web of interdependencies that need to be checked and managed in an efficient manner. The present inventions can relate to the methods of managing these dependencies. To avoid confusion, the following examples are described in relation to programming language JAVA, however, the applicability of the present invention should not be read as being limited solely to JAVA.

The present inventions will be described by way of exemplary embodiments, but not limitations, illustrated in the accompany software code and/or drawings. The present invention introduces a method to efficiently manage the dependencies between the source files, generated source files, and the associated library files.

In one embodiment of the present invention, a two pass compilation process is followed to make the compilation process more efficient. As depicted in FIG. 3, in the first pass, the source files are compiled (301). The Types are contributed to the package. The processed files are then compiled and the resulting Types are contributed to the package. Files having any unresolved types or errors are marked for second pass recompilations. In the second pass, any file that uses the files compiled in the first pass are recompiled (302). Additionally, any files marked for unresolved types or errors are also recompiled. This two pass compilation strategy minimizes the number of compilation cycles that are required to complete the compilation process. The savings becomes quite significant when there are hundreds or thousands of source file in development, test or production environments.

The two pass compilation process is depicted in FIG. 4, as a flow diagram in accordance to the above discussed embodiment. Although this figure depicts functional steps in a particular order for purposes of illustration, the process is not necessarily limited to any particular order or arrangement of steps. One skilled in the art will appreciate that the various steps portrayed in this figure can be omitted, rearranged, performed in parallel, combined, and/or adapted in various ways.

In the first step of the first pass compilation process, an example source file foo.java is compiled (400). The next step is to contribute Types to the package (for e.g. com.bea.my.package) (step 401). This step changes the package. If there are any unresolved types or errors, the source file is marked for second pass compilation (402). The compilation discussed above (of foo.java) produces fooRemote.java. Next, fooRemote.java is compiled (403) and the types from fooRemote are contributed to the package (com.bea.my.package) (step 404). This step changes the package again. In the second pass, all files with errors are recompiled (405). Next, all users (files) of the changed package (com.bea.my.package) are recompiled (406).

In another embodiment of the invention discussed above, the two pass process could be applied to process the annotations of the source files as depicted in FIG. 5. In the first step of the first pass compilation process, an example source file foo.java is compiled to process the annotations (500). The next step is to contribute Types to the package (for e.g. com.bea.my.package) (step 501). If there are any unresolved types or errors, the source file is marked for second pass compilation (502). The compilation discussed above (of foo.java) produces fooRemote.java. Next, fooRemote.java is compiled to process the annotations (503) and the types from fooRemote are contributed to the package (com.bea.my.package) (504). In the second pass, all files with errors are recompiled (505). Next, all users (files) of the changed package (com.bea.my.package) are recompiled (506).

In addition, the present invention introduces a method to further provide an efficient technique to manage the dependencies as depicted in FIG. 6. This method involves partitioning the source code infrastructure that needs to be compiled into groups such as source files having similar dependencies are grouped together and are processed by different threads. Similarly, the code base that does not have any dependencies is grouped together. This portioning technique helps in checking and compiling only the needed files.

In one embodiment of the present invention, source files and libraries could be grouped in a number of combinations. For instance, if one group depicted in FIG. 6 could represent a set of files dependent on a single library or source file or package while another group could represent a set of files dependent on a two or more such library or source files or packages or any combination thereof. Within a group, there could be further sub groups aligned by the dependencies they have in common.

This strategy allows for compiler to focus on only the necessary dependent files in case a change is made or a compilation is needed or build needs to be propagated to different software environments (development, testing, production, etc.). This grouping also holds true for different versions of the same source file such that a file with different versions can be part of the same grouping or sub grouping as appropriate or designed. This partitioning technique allows for subsets that don't have any files that are impacted for software change or need to compile or recompile stay unaffected by recompilation. So, only those files or partitions or groups or sub groups that are impacted by the interdependencies are compiled or recompiled. This reduces the build cycle tremendously and also eliminates any inconsistencies or errors that might get introduced due to recompilation.

In another embodiment of the present invention, source code infrastructure can also be grouped by annotations in source files or library files. This could include both built-in language annotations and custom annotations for a particular application or service. These custom annotations could be for defined classes, methods, interfaces, enums, constructors, and fields. Some annotations may be available only in the source code; others may be available in the compiled class files as well while some annotations might even be available during runtime (in JVM for instance).

In another embodiment of the present invention, interdependencies could be checked and managed by the compiler within the Integrated Development Environment (IDE). The compiler framework could be for a particular language like JAVA or C# or could be an extensible multi-language compiler framework such that the framework can compile a variety of languages. This framework can expose a second set of language APIs for dynamically adding additional language modules to the compiler framework. Such a compiler can check and manage interdependencies across multiple languages for different user operations including but not limited to statement completion, parameter help, testing, error diagnostics, code editing. This facilitates early error detection and reduces the number of times the code needs to be compiled as well as each compile cycle itself.

A compiler framework in accordance with embodiments of the present invention can also make it possible to provide the next level of help to users. Instead of just telling the user that there are interdependency issues in the code, it can offer to fix them.

What is claimed is:

1. A computer-implemented method comprising:
   compiling, in a first compiler pass, one or more source files;
   contributing, in the first compiler pass, one or more types to a package;
   compiling, in the first compiler pass, one or more processed source files that are produced from the compilation of the one or more source files;
   contributing, in the first compiler pass, one or more resulting types to the package;
   marking, in the first compiler pass, one or more source files having unresolved types or errors for second pass compilation;
   compiling, in a second compiler pass, one or more source files that use the source files compiled in the first compiler pass;
   compiling, in the second compiler pass, the marked one or more source files having unresolved types or errors; and
   partitioning the one or more source files into a plurality of groups by annotations, wherein source files of the one or more source files having similar dependencies are grouped together and processed by different threads and source files of the one or more source files that do not have any dependencies are grouped together.

2. The computer-implemented method of claim 1, wherein the method is part of an integrated design environment (IDE).

3. The computer-implemented method of claim 2, wherein the compiling is done while code is being modified by a user.

4. The computer-implemented method claim 1, wherein the compilation includes constructing code using annotations.

5. The computer-implemented method of claim 1, wherein sections of the one or more source files with dependencies are partitioned.

6. An Integrated Design Environment (IDE) system for compiling source code, comprising:
   a processor;
   a compiler configured to compile, in a first compiler pass, one or more source files, wherein the compiler is executed by the processor;
   a contributor configured to contribute, in the first compiler pass, one or more types to a package, wherein the contributor is executed by the processor;
   wherein the compiler is further configured to compile, in the first compiler pass, one or more processed source files that are produced from the compilation of the one or more source files;
   wherein the contributor is further configured to contribute, in the first compiler pass, one or more resulting types to the package;
   a marker configured to mark, in the first compiler pass, one or more source files having unresolved types or errors for second pass compilation;
   wherein the compiler is further configured to compile, in a second compiler pass, one or more source files that use the source files compiled in the first compiler pass; and
   wherein the compiler is further configured to compile, in the second compiler pass, the marked one or more source files having unresolved types or errors; and
   a practitioner configured to partition the one or more source files into a plurality of groups by annotations, wherein source files of the one or more source files having similar dependencies are grouped together and processed by different threads and source files of the one or more source files that do not have any dependencies are grouped together.

7. The Integrated Design Environment system of claim 6, wherein the compiling is done while code is being modified by a user.

8. The Integrated Design Environment system of claim 6, wherein the compilation includes constructing code using annotations.

9. The Integrated Design Environment system of claim 6, wherein sections of the code with dependencies are partitioned.

10. A computer-readable medium comprising code that, when executed by a processor, causes the processor to compile source code, the code comprising:
    compiling, in a first compiler pass, one or more source files;
    contributing, in the first compiler pass, one or more types to a package;
    compiling, in the first compiler pass, one or more processed source files that are produced from the compilation of the one or more source files;
    contributing, in the first compiler pass, one or more resulting types to the package;
    marking, in the first compiler pass, one or more source files having unresolved types or errors for second pass compilation;
    compiling, in a second compiler pass, one or more source files that use the source files compiled in the first compiler pass;
    compiling, in the second compiler pass, the marked one or more source files having unresolved types or errors; and
    partitioning the one or more source files into a plurality of groups by annotations, wherein source files of the one or more source files having similar dependencies are grouped together and processed by different threads and source files of the one or more source files that do not have any dependencies are grouped together.

11. The computer-readable medium of claim 10, wherein the code is part of an IDE.

12. The computer-readable medium of claim 10, wherein the compiling is done while code is being modified by a user.

13. The computer-readable medium claim 10, wherein the compilation includes constructing code using annotations.

14. The computer-readable medium of claim 10, wherein sections of the code with dependencies are partitioned.

* * * * *

UNITED STATES PATENT AND TRADEMARK OFFICE
CERTIFICATE OF CORRECTION

| | |
|---|---|
| PATENT NO. | : 8,201,157 B2 |
| APPLICATION NO. | : 11/743862 |
| DATED | : June 12, 2012 |
| INVENTOR(S) | : Wagner et al. |

It is certified that error appears in the above-identified patent and that said Letters Patent is hereby corrected as shown below:

In column 5, line 22, delete "fooRemotejava." and insert -- fooRemote.java. --, therefor.

In column 5, line 23, delete "fooRemotejava" and insert -- fooRemote.java --, therefor.

In column 5, line 33, delete "foojava" and insert -- foo.java --, therefor.

In column 5, line 37, delete "foojava)" and insert -- foo.java) --, therefor.

In column 5, line 38, delete "fooRemotejava." and insert -- fooRemote.java. --, therefor.

In column 5, line 38, delete "fooRemotejava" and insert -- fooRemote.java --, therefor.

In column 7, line 1, in Claim 4, after "method" insert -- of --.

In column 7, line 32, in Claim 6, delete "practitioner" and insert -- partitioner --, therefor.

In column 8, line 36, in Claim 13, after "medium" insert -- of --.

Signed and Sealed this
Thirtieth Day of October, 2012

David J. Kappos
*Director of the United States Patent and Trademark Office*